March 26, 1935. H. SVENSSON 1,995,333
SPEED CHANGING DEVICE
Filed Nov. 15, 1933 3 Sheets-Sheet 1
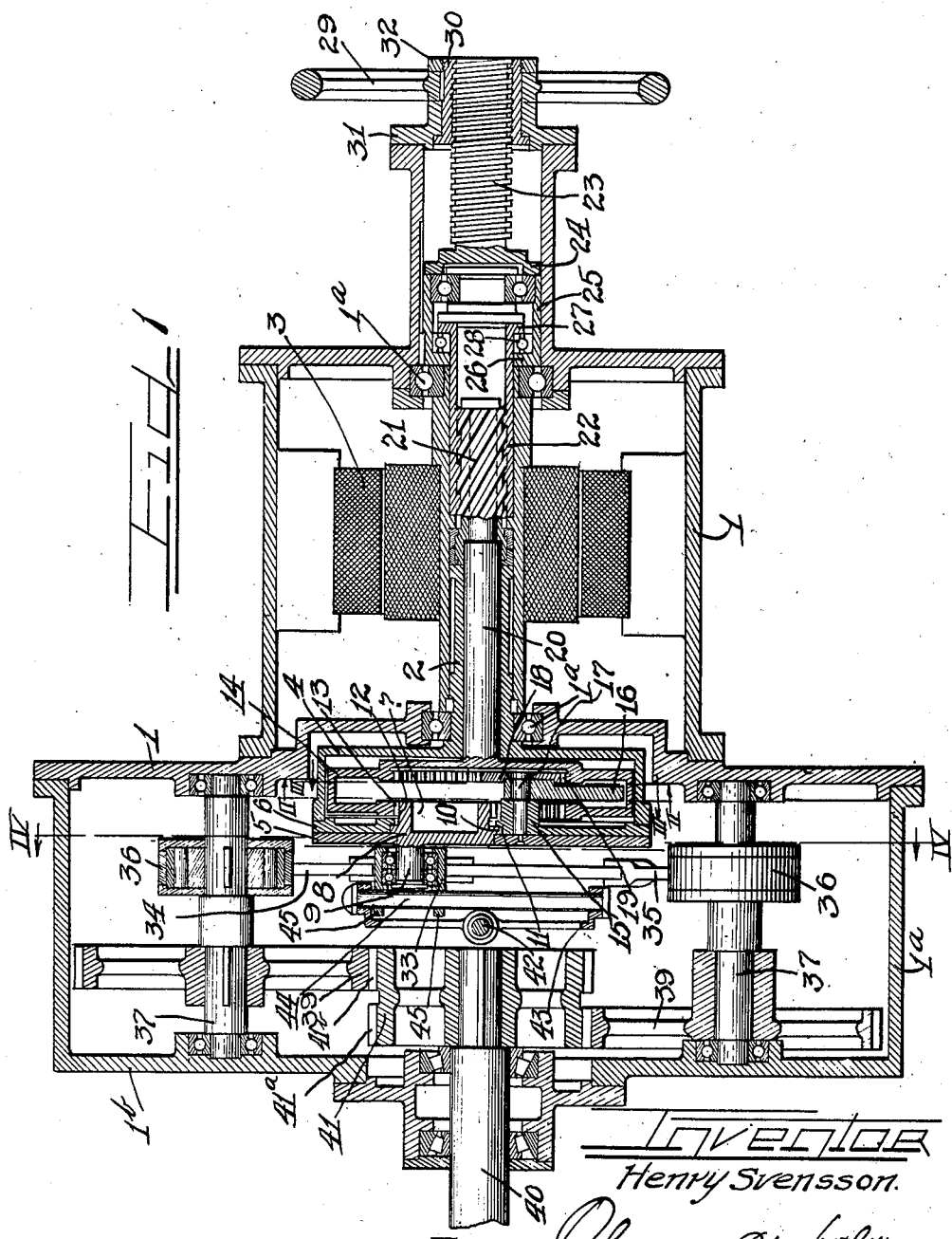

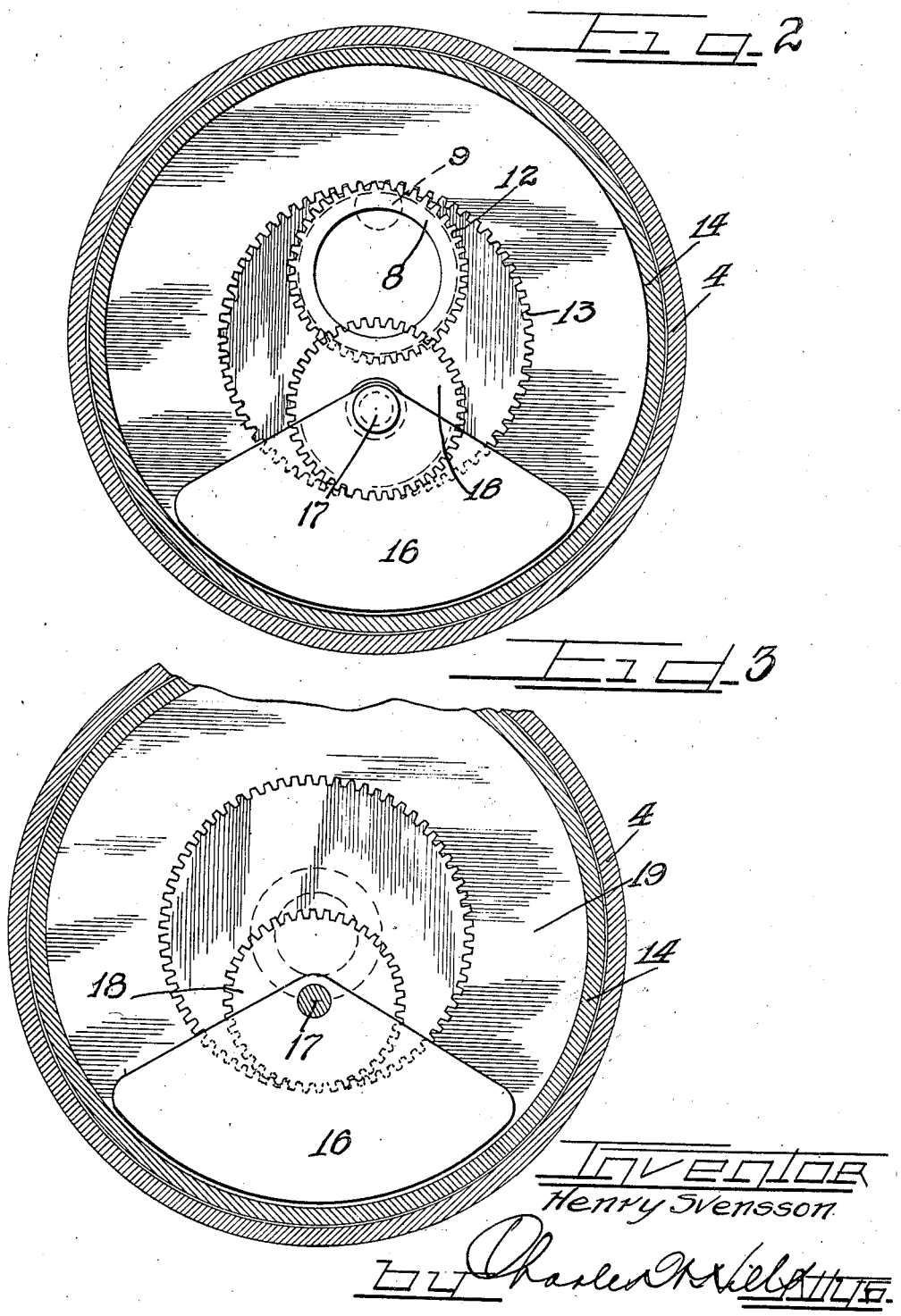

March 26, 1935. H. SVENSSON 1,995,333
SPEED CHANGING DEVICE
Filed Nov. 15, 1933 3 Sheets-Sheet 3
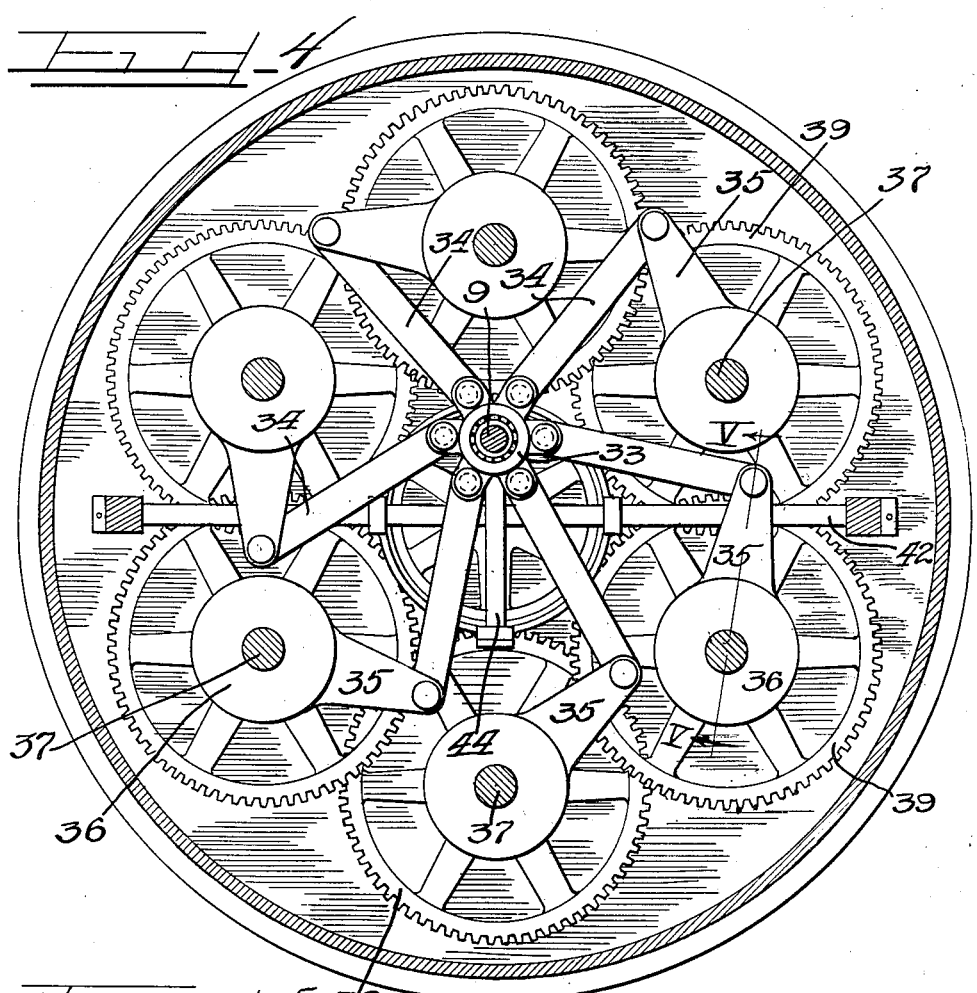
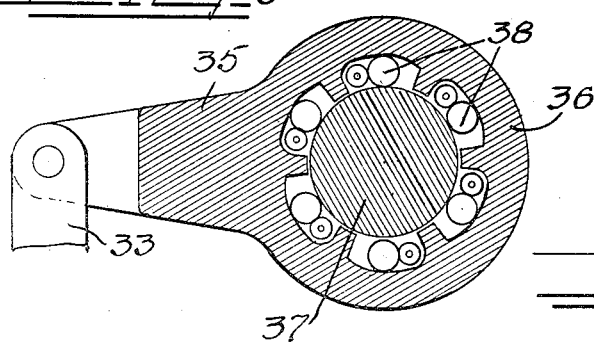
Inventor
Henry Svensson

UNITED STATES PATENT OFFICE 1,995,333

SPEED CHANGING DEVICE

Henry Svensson, Gothenburg Province, Sweden, assignor to Monad Corporation, Chicago, Ill., a corporation of Illinois Application November 15, 1933, Serial No. 698,062

7 Claims. (Cl. 74—600)

This invention relates to a speed changing device and concerns itself with a variable motion transmitting element and means for balancing the same in all of its different positions.

The invention comprises the novel structure and combinations of parts hereinafter described and more particularly pointed out and defined in the appended claims.

In the accompanying drawings which illustrate a preferred form of this invention and in which similar reference numerals refer to similar features in the different views:

Figure 1 is a longitudinal sectional view through a speed changing device or machine embodying this invention.

Figure 2 is a sectional view taken upon the line II—II of Figure 1 looking in the direction of the arrows and showing parts in elevation.

Figure 3 is a sectional view taken upon the line III—III of Figure 1 looking in the direction of the arrows and showing parts in elevation.

Figure 4 is an enlarged sectional view taken upon the line IV—IV of Figure 1 looking in the direction of the arrows and showing parts in elevation.

Figure 5 is an enlarged sectional view taken upon the line V—V of Figure 4 looking in the direction of the arrows.

In referring to the drawings which illustrate a preferred embodiment of this invention, there is shown a casing 1 provided with suitable bearings 1a in which the driving shaft 2 is journaled. This driving shaft may be driven by any suitable source of power such as the motor 3 illustrated within the casing. The forward end of the driving shaft is in the form of an L-shaped flange 4 to which a pair of plates 5 and 6 are rigidly secured. These plates 5 and 6 are provided with an aperture 7 in which the hub 8 of a crank pin 9 is journaled. It will be noted that the aperture and hub 8 are eccentric with respect to the axial center of the driving shaft 2. The hub of the crank pin is provided with a rib 10 that travels in a groove 11 formed in the plate 6. The inner portion of the hub 8 of the crank pin is provided with gear teeth 12 that mesh with gear teeth 13 upon the inner edge of a drum-shaped member 14. This drum-shaped head 14 might be termed an internal gear for rotating the hub of the crank pin 9.

The plate 6 is provided with an inwardly directed boss 15 to which a counterweight 16 is attached by means of a bolt 17. A small gear 18 is secured to the bolt 17 and this gear 18 is in mesh with an internal gear formed upon an annular shoulder upon the drum head 14. It might be mentioned that the gear 18 is of the same size as the hub of the crank pin 9 and is located diametrically opposite the crank pin hub 8. The counterweight 16 is also diametrically opposite the axis of the crank pin. Consequently when the internal gear 14 is rotated in one direction, the hub 8 of the crank pin 9 and the gear 18 will be caused to rotate in opposite directions so that the counterweight 16 will always remain diametrically opposite the crank pin 9 in any position that the crank pin may be rotated by the internal gear 14. In referring to Figure 2, it will be noted that the crank pin 9 is at its maximum distance from the center of the driving shaft 2. When the hub of the crank pin is rotated by the internal gear on the drum 14, the crank pin will move closer to the center of the driving shaft 2 and thus decrease the throw thereof. It might be mentioned that the crank pin 9 can be rotated substantially to the center of the driving shaft so that it will not have any driving radius.

The internal gear 14 which may be termed a double internal gear due to the fact that it has two sets of spaced teeth for operating different elements is carried by a rod 20 which is journaled within the driving shaft 2. The end of the rod 20 is provided with highly sloping ribs 21 which are engaged by a threaded sleeve 22 which is adapted to be longitudinally shifted through the longitudinal movement of a screw element 23. It will be noted that the screw 23 has a head 24 upon its inner end and to which head there is secured a sleeve 25 having an inwardly directed annular flange 26. The screw sleeve 22 on the other hand has an outwardly directed annular flange 27 upon its outer end and a ball bearing 28 is positioned between said inwardly and outwardly turned flanges with the result that when the screw 23 is moved in an outward longitudinal direction the sleeve 22 will be longitudinally moved in the same direction.

In order to longitudinally move the screw 23, there is provided a handwheel 29 which is keyed upon a nut 30 which is in threaded relation with the screw. This handwheel 29 is confined between a sleeve 31 and a nut 32 surrounding the nut 30. Obviously rotation of the handwheel 29 will cause a rotation of the nut 30 which is fastened against longitudinal movement whereby the screw 23 will be compelled to move in a longitudinal direction.

Reverting now to the crank pin 9, it will be noted that a ring 33 is journaled thereon as shown more clearly in Figures 1 and 4. A plurality of links 34 are pivoted to the ring 33 at their inner ends while the outer ends of the links 34 are pivoted to arms 35 which are integral with clutch casings 36. The clutch casings 36 surround shafts 37. Roller clutch members 38 are interposed between the shafts 37 and the housings 36 which are provided with suitable bearing recesses for such a purpose as is well known in the art. In the present instance, there are illustrated six roller clutches for operating a similar number of shafts for successively imparting impulses thereto. The inner ends of the shafts 37 are journaled in an end member of the main casing 1 while the outer ends thereof are journaled in the outer wall of an auxiliary casing 1b which is attached to the end of the main casing and forms a chamber therewith. Upon each shaft 37 there is keyed a gear 39. It will be noted that certain of the gears 39 are keyed near the outer ends of the shafts 37 while others thereof are keyed a short distance from the outer ends thereof for a purpose that will presently appear. A driven shaft 40 is journaled in the auxiliary casing 1b and has keyed thereon within the casing, a double gear 41 comprising the spaced teeth 41a and 41b. Certain of the gears 39 mesh with one set of teeth 41a while the other gears 39 mesh with the other set of teeth 41b. This arrangement produces a good balanced drive with respect to the driven shaft.

The above mentioned ring 33 is designed to travel in a circular path with the crank pin 9, it is however held against rotation upon its own axes by a gimbal joint which is attached to such ring and to the main casing 1. This gimbal joint comprises a transversely extending rod 42 which is anchored to the main casing 1 as shown in Figure 4. A vertical yoke or ring 43 is slidably mounted upon the rod 42 and this yoke carries a vertical rod 44 upon which the ring 33 is slidably connected. To this end, it will be noted that the ring 33 has a pair of extending lugs 45 which are apertured and slidably mounted upon the rod 44. With this construction, it will be evident that the crank pin 9 will carry the ring 33 in a circular path while the gimbal joint will allow it to move in such path but prevent independent rotation thereof.

With the foregoing construction, it is possible to adjust the crank pin 9 to coincide with the center of the driving shaft 2 so that no motion will be imparted to the driven shaft 40. However when the crank pin 9 is adjusted so as to produce a radius with respect to the driving shaft 2, the driven shaft 40 will be rotated and as this radius is increased, the rotation of the driven shaft 40 will be increased. As previously set forth, the crank pin 9 is thuswise adjusted by turning the handwheel 29 which causes the sleeve 22 to move longitudinally for rotating the rod 20 and through the aforementioned gearing causing rotation of the crank pin 9. Movement of the crank pin 9 in one direction during such adjustment, will cause the counterweight 16 to swing in the opposite direction through the aforedescribed gearing with the result that the counterweight 16 will always be diametrically opposite the crank pin 9. As the weight of the counterweight 16 may be computed for properly balancing the crank pin and its connections, it will be appreciated that through the feature of shifting such counterweight, it is possible to balance the crank pin in all of its adjusted positions.

From the foregoing, it will be appreciated that a novel speed changing mechanism has been provided in which an adjustable crank pin is balanced by an adjustable counterweight which moves simultaneously with the adjusting movement of the crank pin to always maintain the proper balanced relation. While no specific use or application has been set forth for this speed changing mechanism, it is contemplated that it may be used wherever it is found desirable to employ such a change speed device.

I am aware that many changes may be made and numerous details of construction may be varied through a wide range without departing from the principles of this invention, and I therefore do not purpose limiting the patent granted hereon otherwise than necessitated by the prior art.

I claim as my invention:

1. In a speed changing device, a driving shaft having a support, a rod mounted in said driving shaft, a double internal gear carried by said rod, a crank pin having a hub rotatably mounted in said support, said hub having gear teeth meshing with one of the gears on said double internal gear, a counterweight secured to said support in opposed relation to said crank pin, a gear secured to said counterweight and meshing with the other gear of said double internal gear and means for rotating said rod for simultaneously adjusting said crank pin and counterweight.

2. In a speed changing device, a driving shaft having a drum-like structure upon one end, a crank pin having a hub journaled in the outer wall of said drum and extending into said drum, said hub having gear teeth upon its inner end portion, a counter-weight within said drum-like structure, a stud secured to said counter weight and journaled in the outer wall of said drum-like structure, a gear upon said stud, a rod journaled in said driving shaft, a double internal gear upon the end of said rod for engaging said gear teeth and gear and means for rotating said rod.

3. In a speed changing device, a driving shaft having a support upon one end, a crank pin having a hub journaled in said support in eccentric relation to the center thereof, a counter weight having means journaled in said support upon an axis in spaced relation to the axis of said hub, and means for simultaneously rotating said hub and counter weight for the purpose set forth.

4. In a speed changing device, a driving shaft having a support upon one end, a cylindrical member journaled in said support in offset relation to the center thereof, a crank pin eccentrically mounted upon said cylindrical member, a counter weight having means journaled in said support upon an axis in spaced relation to the axis of said member and means for simultaneously rotating said hub and counter weight in opposite directions.

5. In a speed changing device, a driving shaft having a support upon one end, a cylindrical member rotatably mounted in said support in offset relation to the center thereof, a crank pin upon said cylindrical member in offset relation to the center thereof, a counter weight rotatably mounted on said support upon an axis in spaced relation to the axis of said member and means for simultaneously rotating said counter weight and cylindrical member.

6. In a speed changing device, a driving shaft having a support upon one end, a cylindrical member journaled in said support in eccentric relation to the center thereof, a crank pin upon said member in offset relation to the center thereof, a rotatable stud in said support in opposed relation to said member, a counter weight secured upon said stud, a rod journaled in said shaft, and gearing connecting said rod with said member and stud whereby said member and stud may be simultaneously rotated thru the rotation of said rod, and means for rotating said rod.

7. In a speed changing device, a driving shaft having a support upon one end, a cylindrical member having a crank pin thereon rotatably mounted in said support in eccentric relation to the center thereof, a counter weight rotatably mounted in said support upon an axis in spaced relation to the axis of said member and, in opposed relation to said member, a rod extending thru said shaft, and gearing actuated by said rod for simultaneously rotating said member and counter weight.

HENRY SVENSSON.